Dec. 25, 1951  G. F. VOIGHT  2,580,142
CUTTING AND SCRAPING TOOL
Filed Nov. 13, 1947  2 SHEETS—SHEET 1
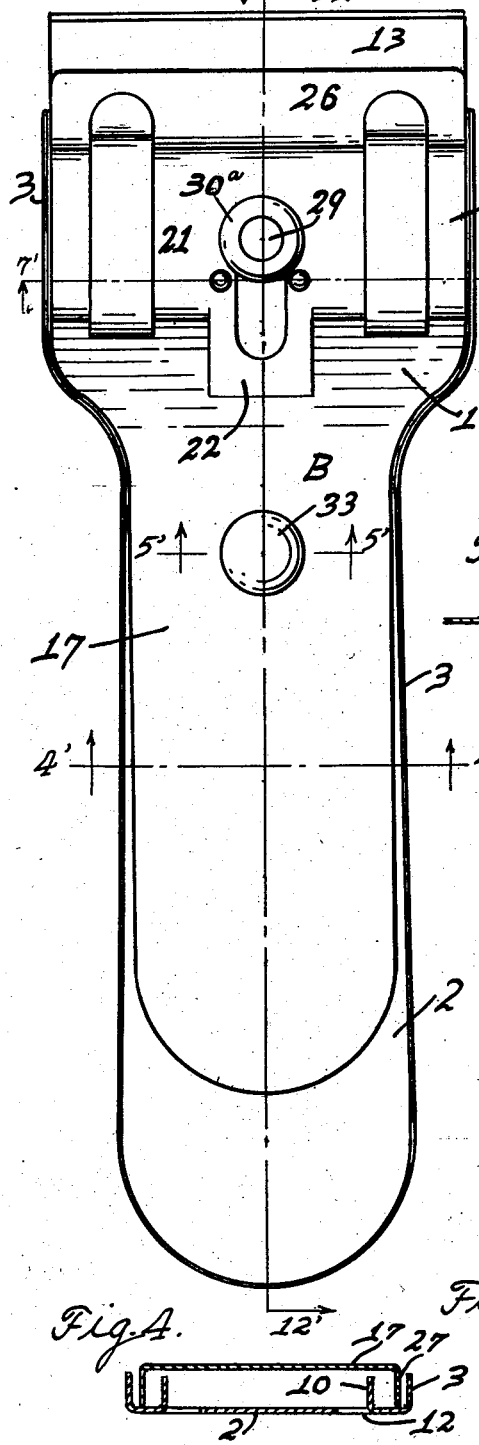
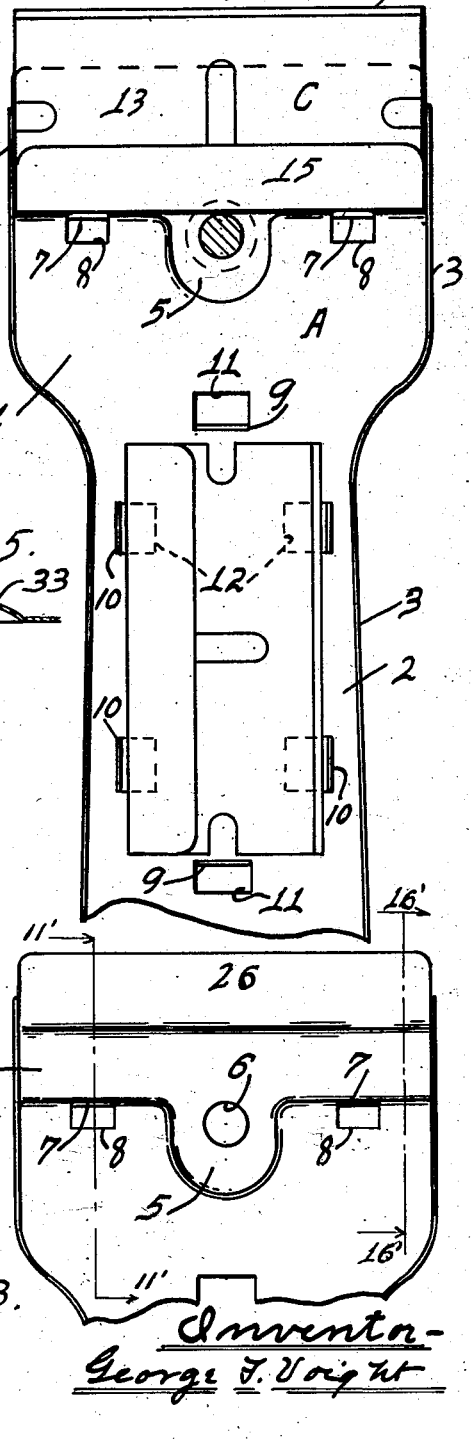
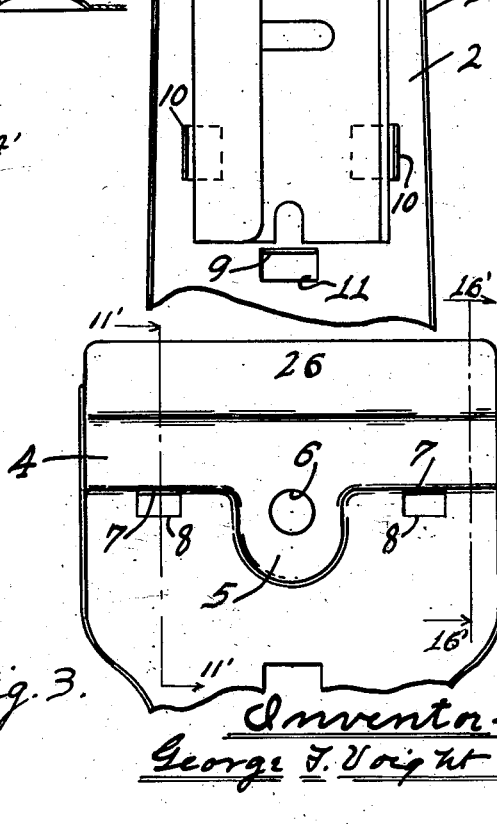
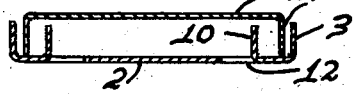
Inventor
George F. Voight

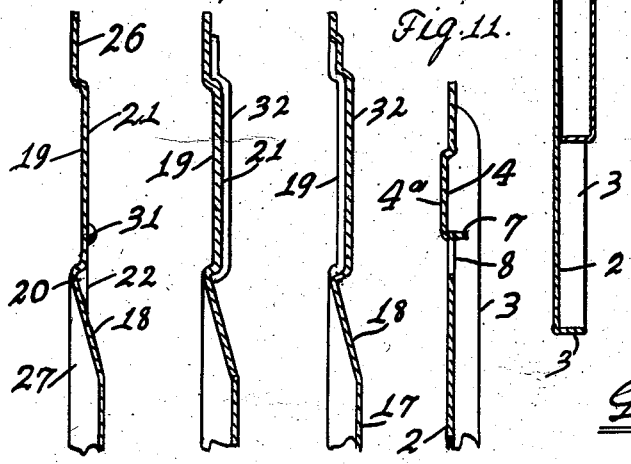

Patented Dec. 25, 1951

2,580,142

UNITED STATES PATENT OFFICE 2,580,142

CUTTING AND SCRAPING TOOL

George F. Voight, El Cerrito, Calif., assignor to Alfred L. Ruff, Oakland, Calif.

Application November 13, 1947, Serial No. 785,713

1 Claim. (Cl. 30—339)

My invention relates to improvements in cutting and scraping tools of the class employing single edge razor blades, or the like, as the cutting and scraping means.

Objects of the invention consist in the provision of a cutting and scraping tool that is inexpensive of manufacture, reliable and dependable of operation, of which the cutting and scraping blade is fixedly but removably locked in position against accidental movement therefrom, and in which means are provided for carrying one or more replacement blades.

Other objects and purposes will be disclosed in the following continuation of the specification, it being understood that changes in the precise embodiment of the invention therein disclosed can be made within the scope of what is claimed without departing from the spirit of the invention.

In the accompanying drawing:

Figure 1 is a top plan view of the present invention with the cutting and scraping blade exposed for use;

Fig. 2 is a top plan view of the master plate with the blade disposed thereon in position for use, and a replacement blade disposed in reserve position in the handle of the tool, a portion of the latter being broken away;

Fig. 3 is a top plan view of the front end portion of the master plate.

Fig. 4 is a cross section on line 4'—4', of Fig. 1;

Fig. 5 is a cross section on line 5'—5', of Fig. 1;

Fig. 6 is a top view of the front end portion of the tool with the complemental plate disposed forwardly relative to the master plate and blade;

Fig. 7 is a cross section on line 7'—7' of Fig. 1;

Fig. 8 is a sectional view on line 8'—8' of Fig. 6;

Fig. 9 is a sectional view taken on line 9'—9' of Fig. 6;

Fig. 10 is a sectional view on line 10'—10' of Fig. 6;

Fig. 11 is a sectional view on line 11'—11' of Fig. 3;

Fig. 12 is a longitudinal sectional view on line 12'—12' of Fig. 1;

Fig. 13 is a longitudinal sectional view of tool showing the complemental plate in its forward or safety position with respect to the master plate and blade;

Fig. 14 is a longitudinal sectional view of the master plate;

Fig. 15 is a longitudinal sectional view of the complemental plate, and

Fig. 16 is a sectional view on line 16'—16' of Fig. 3.

Referring to the drawing in detail, the reference character A designates the master plate, B the complemental plate, and C the blade.

The plate A, which is preferably formed of comparatively thin sheet metal, comprises a forward end portion 1 and a handle portion 2.

An upstanding flange 3 extends from points spaced from the forward edge of the portion 1 on both sides thereof, the flanges continuing along both side edges of the handle portion 2, as well as around the rear end thereof.

The portion 1 has a transversely extending recessed portion 4 having a centrally disposed rearward extension 5; in consequence of the forming of said recessed portion there is formed on the lower face of the plate A a transversely-extending elevated portion 4a and a centrally disposed rearwardly extending elevated portion 5a, the latter having an opening 6 extending therethrough.

At the rear edge of the depression 4 is a pair of upstanding lugs 7, struck out of the portion 1.

A pair of axially disposed upstanding lugs 9, and side lugs 10, are struck from the body of the handle portion 2.

The blade C comprises a knife portion 13 having a cutting edge 14, and a relatively thick bar 15 extending along both sides of the opposite or rear edge of the blade C.

The bar 15 is adapted to fit neatly but removably in the recessed portion between the flanges 3, with the rear edge thereof bearing against the lugs 7 and the portion 13 seating on the forward end of the portion 1, with the cutting edge 14 projecting a distance beyond the front edge of the portion 1.

The lugs 9 and 10, function as stops for holding one or more extra blades therebetween for use as replacements for the operating blade above described secured in the recess 4.

The complemental plate B, which is also preferably formed of comparatively thin sheet metal, comprises a forward end portion 16, a transversely narrowed rear end portion 17 and an intermediate inclined portion 18.

The body of the rear end portion 17 is disposed in plane spaced above the plane of the inner or bottom face of the portion 16.

In the inner or bottom face of the portion 16, at the forward margin of the inclined portion 18, is a comparatively broad transversely extending depression 19, which has a centrally disposed rearwardly extending extension 20 terminating rearwards in said inclined portion 18; the forming of the depression 19 in its extension 20 resulting in a raised portion 21 and raised extension 22 on the upper side of the portion 16.

A downwardly projecting flange 27 extending along on both sides of the portion 17 terminates forwardly adjacent to the rear margin of the depression 19.

The complemental plate B is movable forwardly and rearwardly relative to the master plate and blade, wherefore the portion 16 is fitted slidably between the forward end portions of the flange 3, the flanges 27 being arranged to slide forwardly and rearwardly between the said flanges 3 and the lugs 10.

The primary function of the complemental plate B is to bind the blade C securely and fixedly against the master plate A when the said complemental plate B has been moved either into its forward position in which its forward edge is disposed in advance of the cutting edge of the blade C (Figs. 6 and 13), or into its rearward position in which its forward edge is disposed rearwardly of said cutting edge to expose the latter for use, as shown by Figs. 1 and 12.

A binding screw 29 having a head 30 seating partly against the lower side of the part 4ª and partly against the extension 5ª, and which has a nut 30ª engageable with the upper surface of the raised part 21 and extension 22, projects through the opening 6 and slot 23, the latter extending from the midportion of the raised part 21 to the midportion of the extension 22.

The screw 29 and nut 30ª are designed to hold the complemental plate against movement relative to the master plate and blade after said complemental plate has been moved into either of its above-mentioned forward or rearward positions.

A pair of convex protuberances 31 are formed on opposite sides of the slot 23, and are adapted for engagement by the nut 30ª when the latter bears against the parts 21, and 22 to arrest movement of the screw 29 lengthwise of the slot after it has been operatively shifted to either end of said slot.

Obviously, it is necessary to loosen the nut 30ª on the screw 29 whereby the former can slide over the protuberances 31, before the plate may be moved from one to the other of its two operative positions with respect to the plate A and blade C.

Upwardly struck spaced stiffening ribs 32, extend from the midportion of the binding lip 26 rearwardly across the raised part 21 and terminate at the rearward margin of the depressions 19.

The free edges of the flanges 27 are intended to bear slidably on the upper surface of the master plate A between the flanges 3 and lugs 10.

A convex protuberance 33 of the upper surface of the complemental plate is intended for engagement by the thumb of the hand holding the tool, for moving said plate to either direction longitudinally of the master plate and blade.

What is claimed is:

In a cutting tool, an elongated master plate, including a handle and a wide end, an upstanding flange formed along the longitudinal side edges thereof and end of the handle providing a guide, a transversely disposed depression formed in the upper surface of the wide end between said flanges, an upper complemental plate of a length less than the length of the master plate fitted between the flanges and being movable longitudinally of the master plate, said complemental plate having a depression aligning with the depression formed in the master plate, a blade having a reinforcing bar formed along the rear edges thereof, fitted within the aligning depressions, whereby the blade is held against movement within the aligned depressions, a lug upstanding from the bottom of the depression of the master plate and being spaced from the front wall of the depression a distance equal to the width of the bar, said lug engaging the bar of the blade, said blade being secured within the depression by frictional contact with the wall of the depression and lug, and said complemental plate being movable beyond the cutting edge of the blade to guard said cutting edge, and a screw extending through the plates, securing the plates against movement with respect to each other.

GEORGE F. VOIGHT.

REFERENCES CITED

The following references are of record in the file of this patent:

UNITED STATES PATENTS

| Number | Name | Date |
| --- | --- | --- |
| 1,869,075 | Owens | July 26, 1932 |
| 1,969,785 | Eisenberg | Aug. 14, 1934 |
| 2,105,960 | L'Wolfe | Jan. 18, 1938 |
| 2,336,284 | Nelson | Dec. 7, 1943 |